United States Patent
Billings

(10) Patent No.: US 10,092,841 B2
(45) Date of Patent: Oct. 9, 2018

(54) METHODS AND SYSTEMS FOR DETERMINING A PLAYER POSITION IN A GAME

(71) Applicant: Gamesys Ltd., London (GB)

(72) Inventor: Darse Billings, London (GB)

(73) Assignee: Gamesys, Ltd., London (GB)

( * ) Notice: Subject to any disclaimer, the term of this patent is extended or adjusted under 35 U.S.C. 154(b) by 756 days.

(21) Appl. No.: 14/585,161

(22) Filed: Dec. 29, 2014

(65) Prior Publication Data

US 2015/0258446 A1 Sep. 17, 2015

Related U.S. Application Data

(63) Continuation of application No. PCT/IB2014/059732, filed on Mar. 13, 2014.

(60) Provisional application No. 61/780,931, filed on Mar. 13, 2013.

(51) Int. Cl.
*G06F 17/00* (2006.01)
*A63F 13/58* (2014.01)
*G07F 17/32* (2006.01)

(52) U.S. Cl.
CPC .......... *A63F 13/58* (2014.09); *G07F 17/3237* (2013.01); *G07F 17/3272* (2013.01)

(58) Field of Classification Search
CPC ... G07F 17/3272; G07F 17/3237; A63F 13/58
USPC ....................................... 463/17, 42
See application file for complete search history.

(56) References Cited

U.S. PATENT DOCUMENTS

| 8,727,850 B2 | 5/2014 | Burnside et al. |
| 2002/0155879 A1* | 10/2002 | Walker ................. A63F 3/00063 463/19 |
| 2005/0090307 A1* | 4/2005 | Walker ..................... A63F 9/183 463/20 |
| 2010/0248843 A1 | 9/2010 | Karsten |
| 2010/0279733 A1 | 11/2010 | Karsten et al. |

(Continued)

FOREIGN PATENT DOCUMENTS

| WO | WO2013063441 | 5/2013 |
| WO | WO20140141128 | 9/2014 |
| WO | WO2013118110 | 10/2014 |

OTHER PUBLICATIONS

Smith, Aran, "2010 Draft Lottery Odds", Apr. 16, 2010.*

(Continued)

*Primary Examiner* — Michael Cuff
(74) *Attorney, Agent, or Firm* — Fincham Downs LLC; Magdalena M. Fincham

(57) ABSTRACT

Described herein are methods, systems and apparatus for determining a player position in an instance of a game. Embodiments include retrieving a placement value for each player in a set of players wherein the placement value represents a relative measure of advantages and disadvantages related to position experienced by each player in prior game instances; and determining player position assignments for a current game instance based upon the placement values. In one embodiment, determining player position assignments includes determining a number of lottery entries for each player based on the placement value of each player, the lottery entries being used to determine player positions for the players in a current instance of a game. Numerous additional aspects are disclosed.

18 Claims, 8 Drawing Sheets

(56) References Cited

U.S. PATENT DOCUMENTS

| | | | |
|---|---|---|---|
| 2011/0177863 A1 | 7/2011 | Davidson et al. | |
| 2012/0005043 A1* | 1/2012 | Bushinsky | G06Q 30/0641 705/27.1 |
| 2012/0172133 A1 | 7/2012 | Trexler et al. | |
| 2012/0196686 A1 | 8/2012 | Karsten | |
| 2013/0260876 A1* | 10/2013 | Margalith | A63F 13/85 463/29 |

OTHER PUBLICATIONS

"Swiss Style Tournament", Apr. 8, 2011.*
"2012 World Series of Poker Official Tournament Rules", 2012.*
Written Opinion for PCT/IB2014/059732 dated Nov. 14, 2014; 4 pps.
International Search Report for PCT/IB2014/059732 dated Nov. 14, 2014; 2 pps.
"Swiss-System Tournament" Wikipedia, the Free Encyclopedia (http://en.wikipedia.org/wiki/swiss-system tournament) download date: Oct. 17, 2014; 12 pps.
"Rush Poker" http://www.fulltilt.com/poker/game-types/rush/faq; download date: Apr. 9, 2015; 4 pps.

* cited by examiner

500

| Player Name 502 | Player ID 504 | Number of Hands Played 506 | Number of Button Hands 508 | Number of Small Blind Hands 510 | Number of Big Blind Hands 512 | Number of Other Hands 514 | Placement Value 516 |
|---|---|---|---|---|---|---|---|
| Tom Jones | P0122 | 232 | 45 | 22 | 61 | 104 | -369 |
| Mary Smith | P0312 | 224 | 72 | 45 | 23 | 84 | 34 |
| Sara Joseph | P0041 | 375 | 89 | 54 | 34 | 198 | 87 |
| Rick Lee | P0118 | 181 | 39 | 60 | 41 | 41 | -414 |
| Bob Brown | P7621 | 698 | 23 | 51 | 59 | 565 | -114 |
| Ellen Harris | P0369 | 382 | 36 | 48 | 43 | 255 | -187 |
| Frank Night | P5016 | 113 | 34 | 17 | 12 | 50 | 32 |
| Paul Marks | P0354 | 166 | 61 | 42 | 19 | 44 | -9 |
| Michelle Car | P0443 | 205 | 49 | 25 | 30 | 101 | -54 |
| Dan Brite | P1937 | 125 | 37 | 31 | 35 | 22 | -267 |
| Sally Robert | P2523 | 407 | 25 | 28 | 29 | 325 | 48 |
| Mike Ray | P7215 | 265 | 44 | 29 | 22 | 170 | 54 |

FIG. 5

| Player Name 502 | Player ID 504 | Placement Value 516 | Number of Drawing Entries 602 | Probability Weighting 604 |
|---|---|---|---|---|
| Tom Jones | P0122 | -369 | 46 | 1.59% |
| Mary Smith | P0312 | 34 | 449 | 15.54% |
| Sara Joseph | P0041 | 87 | 502 | 17.38% |
| Rick Lee | P0118 | -414 | 1 | 0.03% |
| Bob Brown | P7621 | -114 | 301 | 10.42% |
| Ellen Harris | P0369 | -187 | 228 | 7.89% |
| Frank Night | P5016 | 32 | 447 | 15.47% |
| Paul Marks | P0354 | -9 | 406 | 14.05% |
| Michelle Car | P0443 | -54 | 361 | 12.50% |
| Dan Brite | P1937 | -267 | 148 | 5.12% |

# METHODS AND SYSTEMS FOR DETERMINING A PLAYER POSITION IN A GAME

PRIORITY CLAIM

The present application is a continuation of International Application PCT/IB2014/059732, with an international filing date of Mar. 13, 2014 and titled METHODS AND SYSTEMS FOR DETERMINING A PLAYER POSITION IN A GAME, filed in the name of Darse Billings as inventor and Gamesys Ltd. as Applicant; which PCT application claims the benefit of priority of U.S. Provisional Patent Application No. 61/780,931, filed Mar. 13, 2013 in the name of Darse Billings and entitled "METHODS AND SYSTEMS FOR DETERMINING A PLAYER POSITION FOR A PLAYER IN A GAME." The entirety of each of these applications is incorporated by reference herein for all purposes.

FIELD

Embodiments of the present invention are related to games (e.g., online or other electronic games), and more particularly to systems and methods for determining a player position in a game which comprises a plurality of available player positions.

BACKGROUND

Various games which support play by multiple players (e.g., online poker and other card games, multi-player slot games, social games, off-line turn-based games on stand-alone devices, etc.) provide multiple player positions which include a distinct position for each participating player. For example, the player who goes first (e.g., has the first turn in a game) to make a decision or perform an activity (e.g., place a wager, select a game element, etc.) in a given round of a game may be placed in a first player position while the next player whose turn it is to make a decision or perform an activity may be placed in a second player position, etc. As defined in more detail below, a round of a game or a game instance is an event or set of events upon the conclusion of which a result (e.g., a payout or prize is to be provided to one or more players) is determined. For example, in a poker game, a game instance may be a hand at the end of which one or more winners of the pot is determined. In another example, in a reeled slot game, a game instance may comprise a spin of the slot reels or, in a multi-player game, a respective spin of the reels for each participating player upon the conclusion of which spins, one or more prizes are awarded among the players.

In some games, different player positions can have respective benefits and drawbacks associated with the player positions. For example, Texas Hold 'Em has become popular over the last several years due to its simplicity, the ability to accommodate a higher number of players per table, internet and tournament poker as well as televised poker. The game is played so that each player has the use of seven cards in order to form a five card poker hand. The player having the highest poker hand is the game winner. Hands are ranked in standard poker fashion, i.e. royal flush, straight flush, four of a kind, full house, flush, straight, three of a kind, two pair, one pair, and high card, in descending order. In Texas Hold 'Em, each player receives two cards face down. Additionally, there are five community cards dealt face up. The term "community card" refers to a non-player specific card that is exposed (face up) and available for use by any of the players in order to form a poker hand. Each player is enabled to use seven cards (i.e., the two concealed cards held by the player, plus the five community cards that are available to each player).

In Texas Hold 'Em, the cards are dealt sequentially so that each player initially receives two cards face down, after which the five community cards are dealt face up. Rounds of betting occur at certain times during the course of the deal, usually after the two face down cards have been dealt, then after the third community card has been dealt (dealt three cards at one time, called the "flop"), then after the fourth community card has been dealt (the "turn"), and finally after the fifth community card has been dealt (the "river"). Thus, there are four rounds of betting, where antes and/or blinds prior to the cards being dealt are considered part of the first round.

When game rules include an ante, all players are required to put a certain fixed amount into the "pot" in order to participate in the hand. In this instance, in a typical game, the player making the first wager is the player positioned in next clockwise sequence of a button player. A blind is also a wager that is required prior to dealing any cards, but in a typical game, the two players positioned in next clockwise sequence of the button player are required to place a "blind" wager, sometimes in unequal amounts. For example, the player positioned to the immediate clockwise sequence of the Button player may be considered the Small Blind with a first required wager amount, and the next player in clockwise sequence may be considered the Big Blind with a second larger required amount (typically twice the Small Blind amount). The usual structure is to use two blinds, but it is possible to play the game with one blind, multiple blinds, an ante, or combination of blinds plus an ante. In a two blind game, after the player cards are dealt, the player positioned in next clockwise sequence of the Big Blind player would make the next wager (the "first" wagers of the first wagering round being made as Small Blind and Big Blind).

To insure that games are fun and fair to all players, especially where there is wagering, it is desirable to insure that the system that provides the game, determines a player's position in the game in a fair and consistent manner. Thus, what is needed are systems and methods for determining a player position in a game.

SUMMARY

In some aspects, embodiments of the present invention provide a method of determining a player position in a game instance. The method includes retrieving a placement value for each player in a set of players wherein the placement value represents a relative measure of advantages and disadvantages related to position experienced by each player in prior game instances; and determining player position assignments for a current game instance based upon the placement values.

In some other aspects, embodiments of the present invention provide a system for determining a player position in a game instance. The system includes a processor; and a memory storing instructions, the instructions adapted to execute on the processor to retrieve a placement value from a database for each player in a set of players wherein the placement value represents a relative measure of advantages and disadvantages related to position experienced by each player in prior game instances; and determine player position assignments for a current game instance based upon the placement values.

In yet other aspects, embodiments of the present invention provide an alternative method for determining, for a current game instance of a game, placement of a player into a particular position of the game, the game including a multi-player game having a plurality of available positions. The alternative method includes determining a first placement value associated with a first player, the first placement value being indicative of relative advantages or disadvantages of at least one position into which the first player was placed in at least one past game instance of the game; determining, based on the first placement value, a first number of entries into a drawing for the particular position, wherein the first player is associated with each entry of the first number of entries; determining a second placement value associated with a second player, the second placement value being indicative of relative advantages or disadvantages of at least one position into which the second player was placed in at least one past game instance of the game; determining, based on the second placement value, a second number of entries into the drawing for the particular position, wherein the second player is associated with each entry of the second number of entries; entering each entry of the first number of entries and each entry of the second number of entries in the drawing; and determining a player to place into the particular position by randomly drawing an entry from among all the entries.

Numerous other aspects are provided in accordance with these and other embodiments of the invention. Other features and aspects of embodiments of the present invention will become more fully apparent from the following detailed description, the appended claims, and the accompanying drawings.

BRIEF DESCRIPTION OF THE DRAWINGS

FIG. 5 is a database table illustrating a first example data structure useful in performing methods according to one or more embodiments described herein.

DETAILED DESCRIPTION OF EXAMPLE EMBODIMENTS

Figure 1:
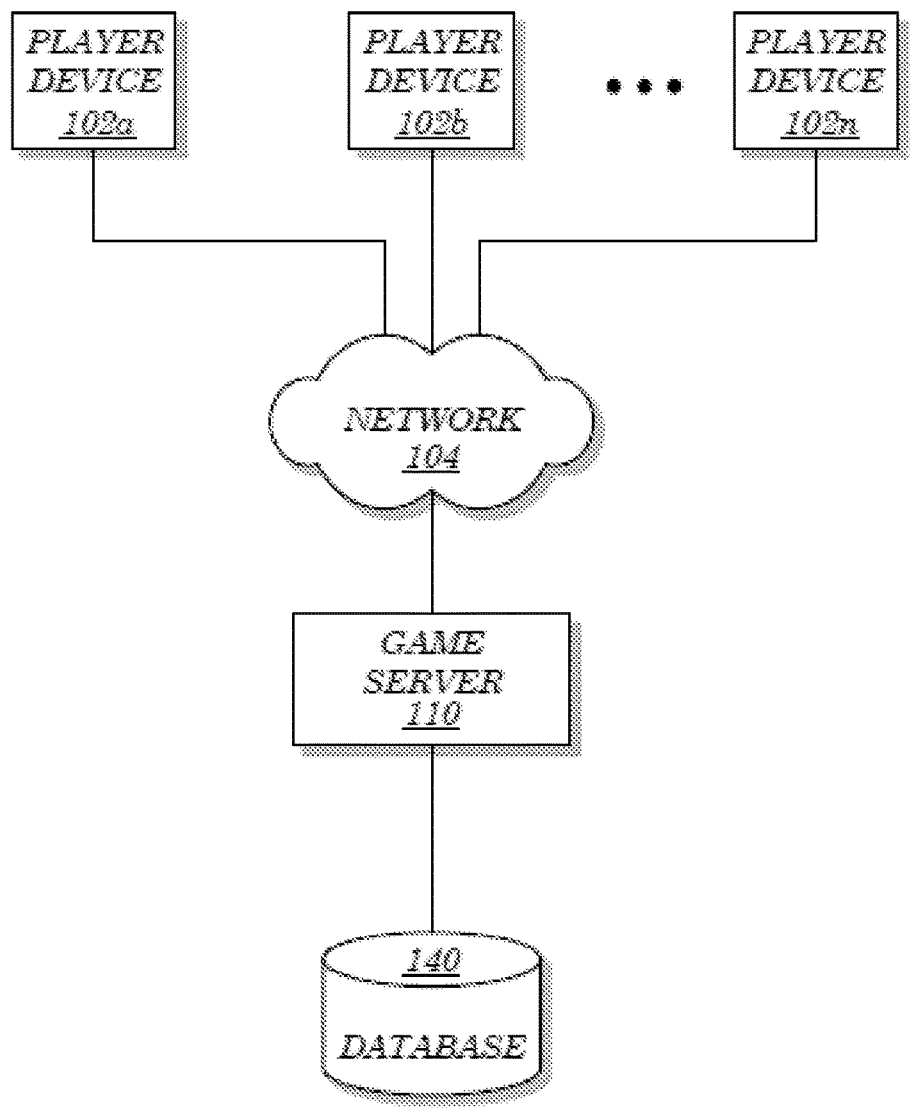
FIG. 1 is a schematic diagram of an embodiment of a distributed computing system in accordance with one or more embodiments described herein.

Embodiments presented herein are descriptive of systems, apparatus, methods, and articles of manufacture for determining a player position in a game. As indicated above, in some games, certain player positions may have specific rules, restrictions or requirements associated therewith (e.g., a player in a certain position may be required to make a predetermined minimum wager or may be restricted from passing under certain circumstances). In some games, certain player positions provide an opportunity to ascertain the decisions or activities other players have made in the game play or game instance of the game, or to determine the game elements which have been provided to other players in the game play or game instance of the game, which opportunity may provide an advantage to a player. Thus, in many games (e.g., card games) certain positions may have associated therewith certain advantages or disadvantages. For example, as illustrated in the foregoing examples, one or more certain positions may be viewed by players as disadvantageous because it requires the player to make certain decisions, participate in particular ways, follow certain rules and/or be subject to certain restrictions that are not applicable to other positions of the game. The Big Blind position in a Texas Hold 'Em card game is an example of a player position which players may consider disadvantageous (e.g., placement in such a position may provide certain disadvantages to a player). The Button position in a Texas Hold 'Em game, on the other hand, is an example of a position which players may consider advantageous (e.g., placement in such a position may provide certain advantages to a player). Applicant has recognized that, for multi-player, multi-position games, if a player were to be placed in a position considered disadvantageous for each game instance in which he/she played, or in a disproportionately high (e.g., compared to other players) percentage of the time, game plays or game instances, the player may become disgruntled, consider such placement unfair and be reluctant to continue participating in the game or to return to a game provider (e.g., website or online gaming establishment) which facilitates the game and determines the position a player is to be placed in for the game.

Some game providers have attempted to solve this issue by rotating the players among the different player positions such that each player is rotated along the available player positions between game plays. For example, in a game where players are positioned around a virtual table and player's turns proceed in a clockwise order, one practice (referred to herein as the simple rotation method) involves, in effect, shifting all players by one position clockwise (e.g., to the left of each player from the players' perspective) between hands (in actuality, the next deal simply begins one place counter-clockwise (e.g., to the right of the prior starting deal position from the player's perspective), rather than having the players move). After one complete "orbit" (i.e., rotation around the table), all players have had a chance to play all positions once. However, if one or more players at the virtual table change before a complete orbit is achieved, this system clearly fails to achieve the desired even distribution of advantages and disadvantages of the various positions.

In another example known methodology for seating players in a Texas Hold 'Em game, every hand is considered a new game, starting over fresh with a new group of players randomly selected from prior groups. In this methodology, the Big Blind position is randomly assigned and over time it is hoped an even distribution results. Applicant has recognized, however, that a simple rotation or a completely random assignment does not solve the problem in a sufficient manner and have invented a new methodology for seating players which takes into account a variety of factors in determining placement of a player into a position and also retains a level of randomness in the placement which renders the game more unpredictable and exciting.

Applicant has invented a methodology for determining placement of players into available player positions in a pseudo-random manner, such that it cannot readily be predicted which player will be placed into a particular position next, but with a built-in bias toward fairness in the sense that the methodology makes it more likely that a player who has previously been placed in a disadvantageous position is not as likely as other players to be so placed again. Thus, instead of merely penalizing players who have gone the longest without being placed in a disadvantageous position as in the prior art, embodiments of the present invention reward recently disadvantaged players. In other words, the methodology, while still having a component of randomness, weights the determination such that fairness is likely to be achieved over a significantly shorter period of time than if the process was completely random. By fairness it is intended that a player who has been placed in a particularly disadvantageous position for a past game play will be less likely to be placed in that disadvantageous position in a subsequent game play while another player who was placed in the past game play in a particularly advantageous position has a higher likelihood of being placed in a disadvantageous position in a subsequent game play. But, again, the element of randomness, albeit weighted towards a desired result, maintains a level of unpredictability in the positioning of players not available in prior methodologies which simply place players in a given position based on having gone the longest without having been placed in the given position.

According to embodiments of the present invention, player positions are determined based on a weighted lottery where each player's chances of being assigned to a particular position is based upon a lottery drawing and the number of entries into the lottery for each position for each player is a function of the player's past position assignments. For example, the number of entries into the lottery for the Big Blind position in a Texas Hold 'Em poker game is reduced if a player has previously been assigned to the Big Blind position.

Applicant believes that the biased yet random methodologies disclosed herein are "fairer" than a uniform random methodology (which would simply select a player for a particular position on a completely random basis), in that the opportunities for being placed in a more advantageous position (or for being placed in a disadvantageous position) will balance out faster. Using a uniform random distribution method will balance out "in the long run," but the number of hands required to be played can be very high and is likely to exceed the number of hands a typical player may play. In contrast to prior art methods, the biased or non-uniform random method disclosed herein converges much faster toward equal opportunities for players to experience all positions. It should be noted that using the biased methodologies disclosed herein may mean that assignments to particularly disadvantageous positions (e.g., the Big Blind in a Texas Hold-Em poker game) may become very fair and experience very fast convergence while all of the other uniform random assignments to positions that are neither very disadvantageous or very advantageous will continue to be improved over a plurality of seating draws. Applicant further notes that utilization of the biased random methodologies disclosed herein provide additional advantages not realized by other known position placement methodologies. For example, the relative positions of players to one another may be taken into account in a fairer manner. For example, it can be an advantage to be placed in a position that takes a turn immediately after a bad player and with the conventional simple rotation methodology, this is an ongoing advantage while with a more random methodology as in the present invention, this advantage would most likely be realized for only one hand.

Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "round of a game", "a game play", or a "game instance of a game", as the terms are used herein (unless specified otherwise), are intended to be synonymous and may general refer to an event or set of events upon the conclusion of which a result is determined. A round of a game may include several turns of a player. A hand of poker is an example of a round of a game. Note that a round of a game may be distinguished from a round of betting in that there may be several rounds of betting in a single round of a game.

A "casual game", as the term is used herein (unless specified otherwise), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game. In some embodiments, a casual game can be a social network game.

A "social network game", as used herein (unless specified otherwise), generally refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

Systems

Turning first to FIG. 1, a block diagram of an example system 100 according to some embodiments is shown. The example system 100 is adapted to implement the methods of the present invention. In some embodiments, the system 100 may comprise a gaming platform such as a gaming platform via which one or more multiplayer and/or online games may be played. In some embodiments, the system 100 may comprise a plurality of player devices 102*a-n* in communication with and/or via a network 104. In some embodiments, a game server 110 may be in communication with the network 104 and/or one or more of the player devices 102*a-n*. In some embodiments, the game server 110 (and/or the player devices 102*a-n*) may be in communication with a database 140. The database 140 may store, for example, game date (e.g., processed and/or defined by the game server 110), data associated with players (not explicitly shown) owning and/or operating the player devices 102*a-n*, and/or instructions that cause various devices (e.g., the game server 110 and/or the player devices 102*a-n*) to operate in accordance with embodiments described herein.

According to some embodiments, any or all of the components 102*a-n*, 104, 110, 140 of the system 100 may be similar in configuration and/or functionality to any similarly named and/or numbered components described herein. Fewer or more components 102*a-n*, 104, 110, 140 (and/or portions thereof) and/or various configurations of the components 102*a-n*, 104, 110, 140 may be included in the system 100 without deviating from the scope of embodiments described herein. While multiple instances of some components 102*a-n* are depicted and while single instances of other components 104, 110, 140 are depicted, for example, any component 102*a-n*, 104, 110, 140 depicted in the system 100 may comprise a single device, a combination of devices and/or components 102*a-n*, 104, 110, 140, and/or a plurality of devices, as is or becomes desirable and/or practicable. Similarly, in some embodiments, one or more of the various components 102*a-n*, 104, 110, 140 may not be needed and/or desired in the system 100.

The player devices 102*a-n*, in some embodiments, may comprise any type or configuration of electronic, mobile electronic, and or other network and/or communication devices (or combinations thereof) that are or become known or practicable. A first player device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102*a-n* may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102*a-n*, the game server 110, and/or the database 140. In some embodiments, the network 104 may comprise direct communications links between any or all of the components 102*a-n*, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102*b* may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 140 of the system 100. The network 104 may comprise one or more cellular telephone networks with communication links between the player devices 102*a-n* and the game server 110, for example, and/or may comprise the Internet, with communication links between the player devices 102*a-n* and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 1) to and/or via the player devices 102*a-n*. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may provide benefits to players based on player referrals and/or based on groups of players that play together in an online multiplayer game.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a standalone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

Figure 2:
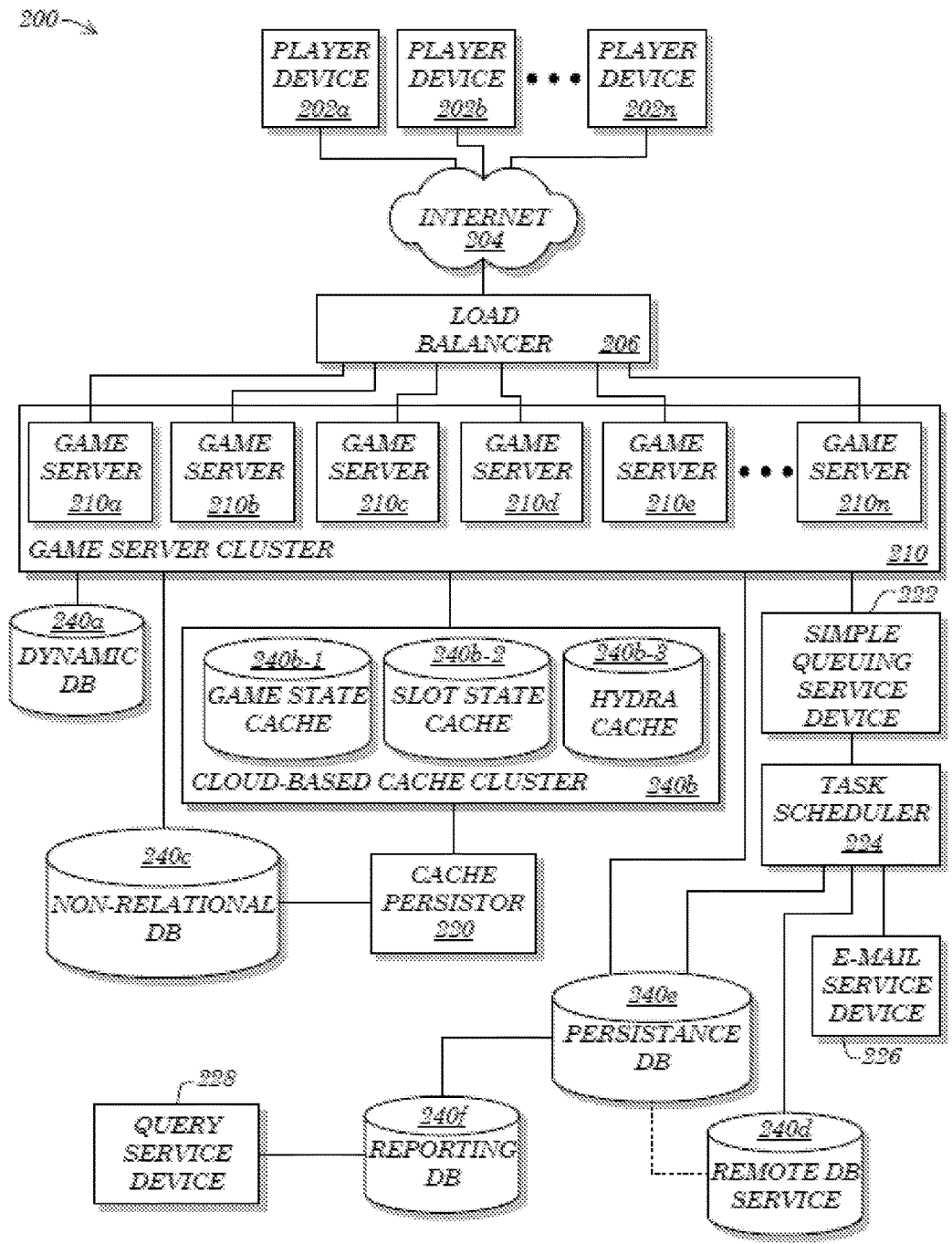
FIG. 2 is a schematic diagram of an embodiment of a distributed computing platform in accordance with one or more embodiments described herein.

Referring now to FIG. 2, a block diagram of a system 200 according to some embodiments is shown. In some embodiments, the system 200 may comprise a gaming platform such as a platform via which social, multiplayer, and/or online games may be played. In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210c may host a second particular session of an online bingo game (or tournament), a third game server 210c may facilitate an online poker tournament (e.g., and a corresponding plurality of game sessions that comprise the tournament), and/or a fourth game server 210d may provide an online slots game (e.g., by hosting one or more slot game sessions).

In some embodiments, the player devices 202a-n may comprise various components (hardware, firmware, and/or software; not explicitly shown) that facilitate game play and/or interaction with the game server cluster 210. The player device 202a-n may, for example, comprise a gaming client such as a software application programmed in Adobe® Flash® and/or HTML 5 that is configured to send requests to, and receive responses from, one or more of the game servers 210a-n of the game server cluster 210. In some embodiments, such an application operating on and/or via the player devices 202a-n may be configured in Model-View-Controller (MVC) architecture with a communication manager layer responsible for managing the requests to/responses from the game server cluster 210. In some embodiments, one or more of the game servers 210a-n may also or alternatively be configured in a MVC architecture with a communication manager and/or communications management layer (not explicitly shown in FIG. 2). In some embodiments, communications between the player devices 202a-n and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202a-n and the game server cluster 210 may be managed and/or facilitated by the load balancer 206. The load balancer 206 may, for example, route communications from player devices 202a-n to one or more of the specific game servers 210a-n depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210a-b to experience detrimental issues), the load balancer 206 may call and/or bring online one or more of the other game servers 210c-n depicted in FIG. 2. In the case that each game server 210a-n comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202a-n and the game server cluster 210 are conducted and/or routed. Such proxy servers and/or devices may comprise one or more regional game hosting centers, for example, which may be geographically dispersed and addressable by player devices 202a-n in a given geographic proximity. In some embodiments, the proxy servers and/or devices may be located in one or more geographic areas and/or jurisdictions while the game server cluster 210 (and/or certain game servers 210a-n and/or groups of game servers 210a-n thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202a-n such as by utilizing a broadcaster device (also not separately shown in FIG. 2) that transmits the time-released game results to the player devices 202a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210a-n thereof) may be in communication with the dynamic DB 240a. According to some embodiments, the dynamic DB 240a may comprise a dynamically-scalable database service such as the DyanmoDB™ service provided by Amazon® Web Services, LLC. The dynamic DB 240a may, for example, store information specific to one or more certain game types (e.g., slots) provided by the game server cluster 210 such as to allow, permit, and/or facilitate reporting and/or analysis of such information.

According to some embodiments, the game server cluster 210 (and/or one or more of the game servers 210a-n thereof) may be in communication with the cloud-based cache cluster 240b. Game state information from the game server cluster 210 may be stored in the game state cache 240b-1, for example, slot state (e.g., slot-game specific state) data may be stored in the slot state cache 240b-2, and/or other game and/or player information (e.g., progressive data, player position data, player rankings, audit data) may be stored in the hydra cache 240b-3. In some embodiments, the cache persistor 220 may move and/or copy data stored in the cloud-based cache cluster 240b to the non-relational DB 240c. The non-relational DB 240c may, for example, comprise a SimpleDB™ service provided by Amazon® Web Services, LLC. According to some embodiments, the game server cluster 210 may generally access the cloud-based cache cluster 240b as-needed to store and/or retrieve game-related information. The data stored in the cloud-based cache cluster 240b may generally comprise a subset of the newest or freshest data, while the cache persistor 220 may archive and/or store or move such data to the non-relational DB 240c as it ages and/or becomes less relevant (e.g., once a player logs-off, once a game session and/or tournament ends). The game server cluster 210 may, in accordance with some embodiments, have access to the non-relational DB 240c as-needed and/or desired. The game servers 210a-n may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
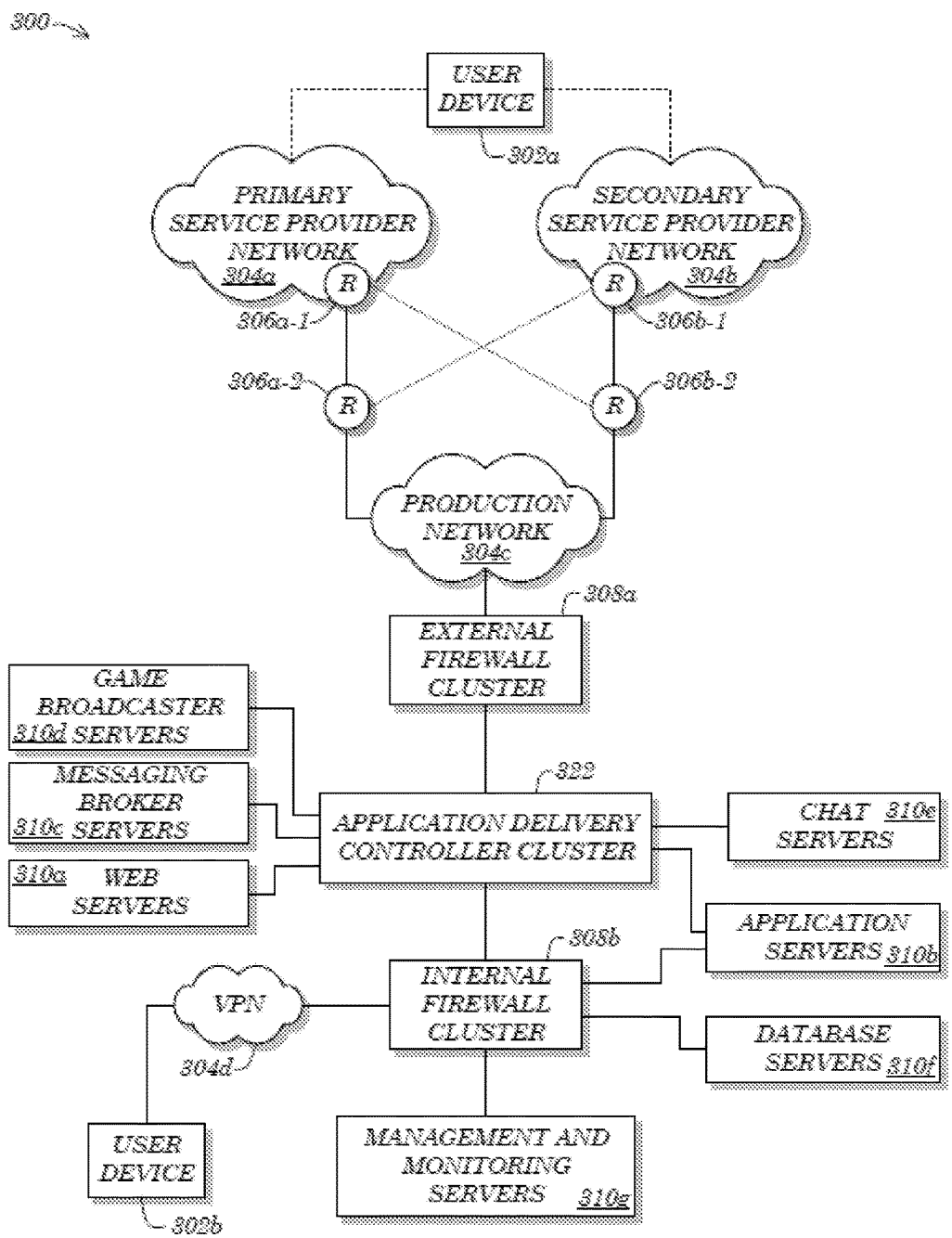
FIG. 3 is a block diagram of an embodiment of a system in accordance with one or more embodiments described herein.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played. In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 304*a* may comprise an electronic device owned and/or operated by a player of an online game (not explicitly shown) and/or by an entity that otherwise accesses online game content and/or services externally (e.g., requiring external login and/or access credentials and/or procedures). The first user device 304*a* may, for example, be utilized to access content provided by and/or via the application delivery controller cluster 322. In some embodiments, the first user device 304*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 304*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and//or commands from the first user device 304*a*. The first user device 304*a* may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 304*a* and one or more of the servers 310*a-g*. In the case that the first user device 304*a* is utilized to access an online gaming interface for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 304*a* (and/or from one or more of the other servers 310*a-b*, 310*d-g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 304*a* (e.g., facilitating a decoupling of services provided by various applications on and/or from the various servers 310*a-b*, 310*d-g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 304*a* (e.g., in connection with the play of an online bingo, slots, and/or other game for which broadcast information may be utilized). In some embodiments, the chat servers 310*e* may provide, manage, and/or facilitate communications between the first user device 304*a* (and/or first user thereof) and one or more other player/user devices (such as a second user device 302*b* and/or other player/user devices not shown in FIG. 3).

According to some embodiments, the second user device 304*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 304*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 304*b* may, for example, be required to provide credentials to and/or otherwise access the application delivery controller cluster 322 and/or servers 310*a-g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 304*b*. The second user device 304*b* may, for example, access the management and monitoring servers 310*g* and/or the database servers 310*f* to run reports descriptive of online gaming operations, game play, and/or game referral setup, management, and/or analysis. According to some embodiments, either or both of the user devices 304*a-b* in conjunction with one or more of the servers 310*a-g* and/or the application delivery controller cluster 322 may conduct (in whole or in part), facilitate, and/or otherwise be associated with execution of one or more stored procedures, applications, processes, and/or methods (e.g., the methods described herein below, and/or a portion thereof).

Utilization of the term "server" with respect to the servers 310*a-g* of the system 300 of FIG. 3 is meant solely to ease description of the configuration and/or functionality of the servers 310*a-g*. The term "server" is not intended to be limiting with respect to any particular hardware, software, firmware, and/or quantities thereof utilized to implement any or all of the servers 310*a-g* of the system 300. Similarly, while multiple types and/or instances of the severs 310*a-g* are depicted in FIG. 3, any or all of the servers 310*a-g* may be implemented in, on, and/or by one or multiple computer server(s) and/or other electronic devices.

Methods

The above described systems and apparatus are adapted to perform the following methods of the present invention. In other words, for example, the user devices described above are adapted to be used by players to participate in games implemented on the gaming systems also described above. It will be understood that the methods described below can be implemented in software (e.g., processor instructions adapted to be executed by the systems and apparatus described above) developed using any number of various computer languages and programming techniques such as object oriented programming. It will be further understood that any of the methods can alternatively or additionally be implemented in hardware and that any particular arrangement, order, grouping, and/or structure of hardware and software components, modules, functions, objects, and/or portions thereof described herein are merely illustrative of example embodiments and any practicable arrangement capable of performing the methods disclosed herein is intended to be covered by this specification. In accordance with some embodiments, methods are provided that are adapted to use an algorithm for placing each player of a plurality of players in a respective available position of a plurality of available positions in an electronic multi-player game. Thus, the system is adapted to determine, for a current game instance of the game (e.g., for a current hand of a card game), a particular position for each such player based on a respective value (e.g., a numerical value) associated with each such player.

Figure 4:
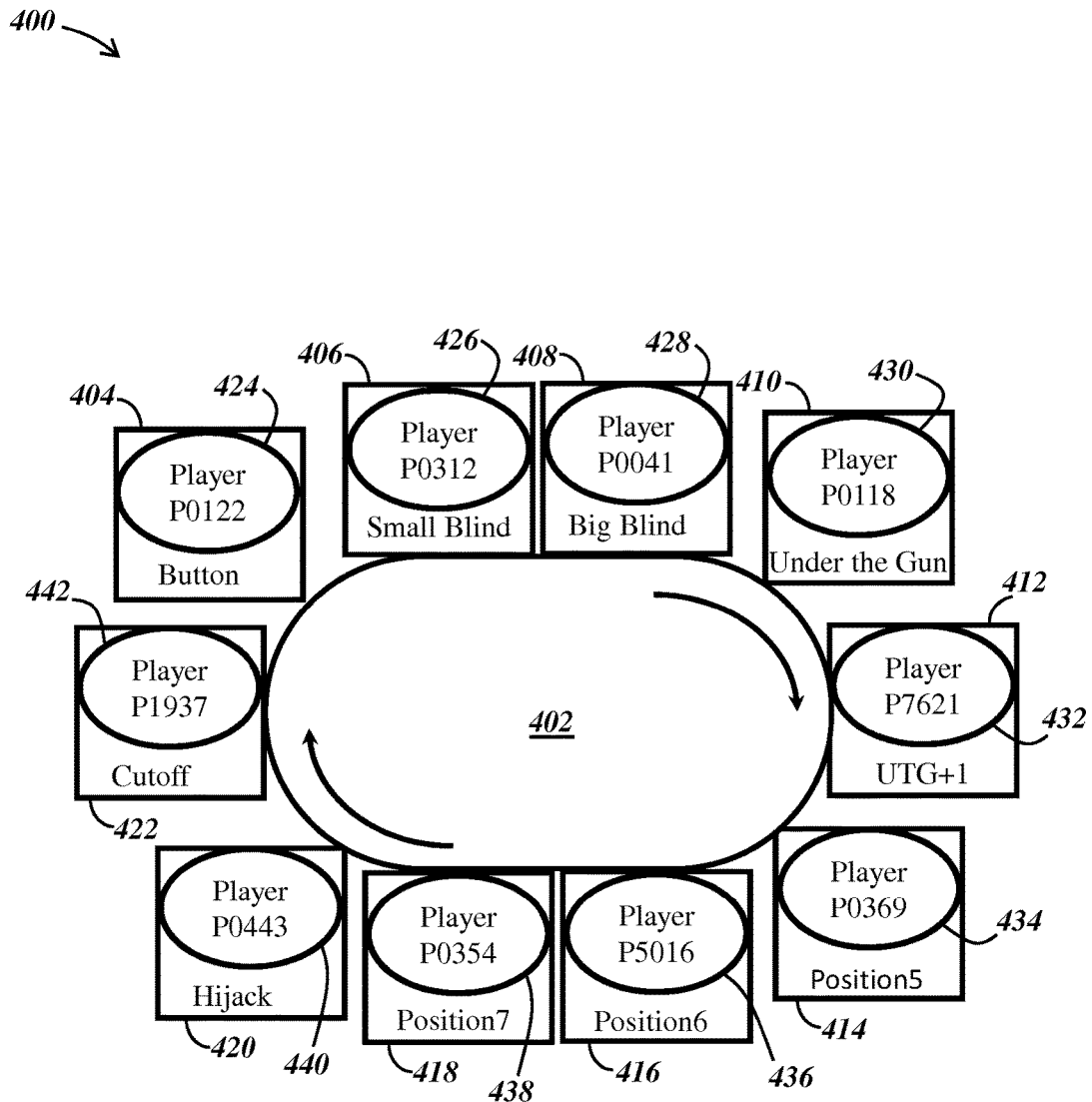
FIG. 4 is a block diagram depicting an example of a virtual game table layout according to one or more embodiments described herein.

Turning to FIG. 4, a depiction of an example virtual game table layout 400 is provided. The layout 400 represents a game table 402 with player positions 404-422 disposed around the table 402. In the example provided, there are ten player positions but in practice the table 402 can include any number of player positions that is practicable with the particular game being played. For the sake of an illustrative example, the depicted example table layout 400 is for a Texas Hold 'Em Poker game. Thus, the player positions 404-422 are labeled in play turn order starting with the Button position 404, and proceeding clockwise to the Small Blind position 406, the Big Blind position 408, the Under the Gun position 410, the Under the Gun Plus One position 412, Position5 414, Position6 416, Position7 418, the Hijack position 420, and the Cutoff position 422. Players 424-442 are assigned to the positions 404-422 respectively for play of each game instance according to the methods of the present invention.

In some embodiments, the players 424-442 are assigned to the positions 404-422 based upon a weighted lottery system that uses a value associated with each player 424-442 to pseudo-randomly select player positions. The value associated with each player may be a value based on the position into which the player had been placed during a previous game instance (e.g., the position the player had been placed in for a previous hand of a card game). In accordance with some embodiments, each available player position for a game is associated with a particular predetermined value, the value being selected to reflect relative advantages or disadvantages associated with the position. For example, a more negative value (i.e., a value more below zero) may be associated with a first position considered to be relatively more disadvantageous to a player placed therein than a second position considered to be less disadvantageous (i.e., still somewhat disadvantageous but not as disadvantageous) to the player. On the other hand, a positive value (i.e., a number greater than zero) may be associated with a position considered to be advantageous to the player, with the value being larger or more above zero the more advantageous the position.

In a more particular example of relative values which may be associate with various positions in a Texas Hold 'Em poker game, the Big Blind position 408 may be associated with a value of (−10), the Small Blind position 406 may be associated with a value of (−4), the Button position 404 may be associated with a value of (+5) and all other positions 410-422 may be associated with a value of (+1). Of course, the numerical scale in the preceding example which uses negative values as corresponding to disadvantageous positions and positive values as corresponding to advantageous positions is exemplary only. Any alphanumerical or symbol scheme which includes a relative scale allowing for distinguishing between positions which are disadvantageous and positions which are advantageous may be used, which may be nuanced enough in some embodiments to further distinguish positions which are somewhat disadvantageous from those which are very disadvantageous and positions which are somewhat advantageous from those which are very advantageous. In another simple example, the following vector representing relative values which may be associate with the various positions in a Texas Hold 'Em poker game (Small Blind, Big Blind, UTG, . . . ) can be [−14, −25, 1, 2, 3, 4, 5, 6, 8, 10]. In another example, the Texas Hold 'Em position values can each have one or more additional elements associated with them that are used to distinguish positions. For example, a characterization of betting context can be associated with each position: [(−14, raise2), (−25, raise2), (1, open), (2, open), (3, flat1), (4, flat2), (5, flat2), (6, raise1), (8, raise1), (10, raise1)].

In yet another example, embodiments of the present invention can apply the concept of a biased lottery to any game involving assignment of players to positions, ranks, or roles in a character-based game. For example, in a game where players are assigned character types, ranks, or roles (e.g. Sorcerer, Warrior, Rogue, etc.), each role having distinct attributes (e.g., abilities, liabilities, strengths, weaknesses, etc.), the methods of the present invention could be applied to ensure a fair balance of each role over repeated instances of the game. An example of a complex vector expressing the values to be associated with each role where the game defines six attributes in terms of percentiles, could be:

[(Warrior, 66.2, 91.0, 72.2, 2.5, 12.3, 4.4)
(Sorcerer, 11.4, 9.9, 98.6, 81.0, 2.2, 8.5)
(Rogue, 24.3, 34.4, 18.7, 29.9, 77.7, 62.9)]

In accordance with some embodiments, upon a player being placed in a particular position for a game instance of a game, the value associated with the position may be stored in association with the player for use in determining a subsequent position for the player in a future game instance of the game. Such a value, determined based on the position a player has been placed in and used for purposes of determining a future placement of the player, is referred to as the player's Placement Value herein. A Placement Value may, in some embodiments, be a value which is a sum of values for a plurality of placements over a plurality of game instances of a game (e.g., all placements of the player during a session or tournament of the game).

FIG. 5 depicts an example embodiment of a portion of a database table 500 adapted to store player Placement Values. In the example shown, twelve player records are represented by the twelve rows of data to illustrate the example data structure but it would be understood that many additional records can be included, one for every player. Each record includes eight example fields 502-516 that store information about each player. It will be understood that more or less fields can be used and the eight shown in FIG. 5 are merely illustrative examples. Likewise, the particular data values included in the depicted database table 500 are merely examples selected to illustrate features of the methods of the present invention.

In the example table 500 shown in FIG. 5, the example fields include a Player Name field 502, a Player ID field 504, a Number of Hands Played field 506, a Number of Button Hands field 508, a Number of Small Blind Hands field 510, a Number of Big Blind Hands field 512, a Number of Other Hands field 514, and a Placement Value field 516. The Player Name field 502 is adapted to store a representation of a player's name for the player associated with the record. The Player ID field 504 is adapted to store an indicia representative of a unique identifier for the player associated with the record. The Number of Hands Played field 506 is adapted to store a value representative of the total number of game instances (e.g., hands) that the player associated with the record has played. In some embodiments, this field may represent the number of hands played since the player started playing and in some alternative embodiments, the field may represent the number hands played from a pre-defined start date. In some embodiments, this field may be calculated by summing the values of other fields (e.g., fields 508-514).

The Number of Button Hands field 508 is adapted to store a value representative of the number of game instances (e.g., hands) that the player associated with the record has played while in the Button position 404. The Number of Small Blind Hands field 510 is adapted to store a value representative of the number of game instances (e.g., hands) that the player associated with the record has played while in the Small Blind position 406. The Number of Big Blind Hands field 512 is adapted to store a value representative of the number of game instances (e.g., hands) that the player associated with the record has played while in the Big Blind position 408. The Number of Other Hands field 514 is adapted to store a value representative of the number of game instances (e.g., hands) that the player associated with the record has played while in positions other than the Button position 404, the Small Blind position 406, or the Big Blind position 408 (e.g., positions 410-422).

In some embodiments, a player may be assigned a predetermined number of points upon being placed in a particular position, the points corresponding to the particular position in a table or database associated with the game. The point value (or number of points associated with a player as a result of which position(s) the player has been placed in) may comprise a species of a Placement Value. The Placement Value field 516 is adapted to store a value representative of the Placement Value.

In some embodiments, a running point total or other type of Placement Value may be tracked and stored for a player over a plurality of game plays. For example, the running point total or running Placement Value of a given player may track points or another type of Placement Value assigned to the player (i) over a current session or tournament, (ii) over a predetermined period of time (e.g., over the past month), (iii) over the player's lifetime playing with a particular gaming entity or playing a particular game and/or (iv) until a predetermined "reset" event is achieved by the player (which event may, in some embodiments, cause the number of points or other type of Placement Value associated with the player to be reset to zero or some other predetermined starting value).

In the particular example illustrated in FIGS. 4 and 5, player placements were determined based on the Placement Values shown in the Placement Value field 516 for the listed players. Placement Values were computed based on the following formula:

$$PV = [(+5)(BH)] + [(-4)(SBH)] + [(-10)(BBH)] + [(+1)(OH)]$$

Wherein PV represents Placement Value, BH represents the value in the player's Number of Button Hands field 508, SBH represents the value in the player's Number of Small Blind Hands field 510, BBH represents the value in the player's Number of Big Blind Hands field 512, and OH represents the value in the player's Number of Other Hands field 514. Note that the example weighting constants that are multiplied by the variables are selected to represent the relative advantageousness or disadvantageousness of the corresponding variable (i.e., position).

Note for example, that Player #P0122 who had a relatively large negative Placement Value compared to the other listed players, was placed in the advantageous Button position 404 in FIG. 4. In this example system based on the above example formula, the more negative a player's Placement Value, the more the player has experienced disadvantageous positions in prior game instances and the less the player has experienced advantageous positions in prior game instances. Note also that Player #P0122 did not have the largest negative Placement Value; Player #P0118 has a larger negative Placement Value. Thus, in some embodiments, Placement Value may be used to influence placement but may not be determinative. As will be discussed in more detail below, in some embodiments, Placement Value can be used to determine a relative probability compared to other players in the current group of players that the player will be assigned to a particular position.

In another example illustrated in FIGS. 4 and 5, note that Player #P0041 who had the largest positive Placement Value was placed in the disadvantageous Big Blind position 408. In this example system based on the above example formula, the more positive a player's Placement Value, the more the player has experienced advantageous positions in prior game instances and the less the player has experienced disadvantageous positions in prior game instances. Note that Player #P0041 had the largest positive Placement Value of all the players listed.

As described herein, in accordance with some embodiments a methodology is contemplated which weights or biases an otherwise random result to increase the likelihood of a desired result. In accordance with some embodiments, such a desired result may be that a player who has been placed in a disadvantageous position of a game in a past game play of the game is not also placed in the disadvantageous position in a subsequent game play of the game. In accordance with some embodiments, it is contemplated that an algorithm selects the player to place in a particular position of a game by selecting an entry from a pool of entries, the pool of entries comprising zero or more entries from each player participating in the game play for which the placement is being determined. It should be emphasized that in some embodiments it is contemplated that a player is assigned zero entries into a drawing for a particularly disadvantageous position if, for example, that player has been assigned to that position an "unfair" number of times or more than a predetermined number of times or if that player's Placement Value is within some predetermined range of placement values. In some embodiments, the Placement Value associated with a player is used to determine how many entries to assign to the player to be included in the pool of entries, from which pool of entries one entry is selected in a lottery-type or drawing-type determination or algorithm. Such a lottery or drawing determination or algorithm may be performed, for example, for a particularly disadvantageous position (and, in some embodiments, for each other position of the game until all positions have players selected therefor).

In one illustrative and non-limiting example, assuming the lottery or drawing is held to determine which player should be placed in the most disadvantageous position of the game for the next game instance of the game (e.g., which player should be placed in the Big Blind position of a Texas Hold 'Em poker game), the player with the most negative Placement Value (i.e., the number most below zero) may be provided with the fewest entries into the drawing while the player with the most positive Placement Value (i.e., the number most above zero) will be provided with the most entries into the drawing. Once each player participating in the next game instance of the game is provided with an appropriate number of entries based on his/her Placement Value, a random or pseudo-random algorithm may be utilized to select, from the pool of entries, the entry whose associated player is to be placed into the position for which the drawing is being held (e.g., the most disadvantageous position in the present example). As will be appreciated, if the drawing were being held to determine which player is to be placed in the most advantageous position of the game, the player with the most negative Placement Value may be provided with the largest number of entries, thus increasing his/her chances of being placed into the most advantageous position for the next game instance.

As can be appreciated from the above example of a numerical scale which utilizes negative Placement Values to reflect placement in one or more disadvantageous positions and positive Placement Values to reflect placement in one or more advantageous positions, in some embodiments a mathematical function may be applied to the Placement Values of players in order to determine an appropriate number of entries to associate with each player participating in the next game instance of the game (e.g., because it may not be desirable to attempt to assign a negative number of entries in the drawing, it may not be desirable to have a one-to-one correspondence between the Placement Value of a player and the number of entries in the drawing).

One example mathematical function which may be applied to the Placement Values is the addition of a constant comprising a positive number, the numerical constant applied being sufficiently large such that addition of it to even the most negative Placement Value possible will result in a positive number (e.g., +1), which resulting number may then be used to determine the number of entries to associate with a player. In other words, a player's Placement Value can be converted to a number of lottery entries for the player by adding the same constant to each of the Placement Values of all the players participating in the game instance so that none of the resulting numbers are negative. In some embodiments, the constant to be added to each Placement Value of the set of Placement Values being used to determine entries for a particular drawing may be dynamically determined based on the particular set of Placement Values, such that the numerical constant is determined to be sufficient to yield a predetermined positive result (e.g., +1) when added to the most negative Placement Value of the set of Placement Values being evaluated. For example, in the set of Placement Values listed in in table 500 of FIG. 5, the constant "415" can be added to each of the Placement Values to determine the number entries for each player for a drawing for a particular position.

Figure 6:
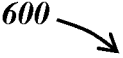
FIG. 6 is a database table illustrating a second example data structure useful in performing methods according to one or more embodiments described herein.

FIG. 6 depicts an example embodiment of a database table 600 adapted to store player Placement Values and other data for a particular game table 402. In the example shown, ten player records for ten players selected (e.g., randomly) to play a game instance together (e.g., at the same virtual game table 402) are represented by the ten rows of data to illustrate the example data structure. Note that fewer records could be included if the particular game table 402 was not full or if the game table had fewer player positions. Note that ten records are included based on the example used above in FIG. 4 wherein the game table 402 has ten player positions 404-422. Additional records would be included if the system used game tables with additional positions. Each record includes five example fields 502, 504, 516, 602, 604 that store information about each player. It will be understood that more or less fields can be used and the five shown in FIG. 6 are merely illustrative examples. Likewise, the particular data values included in the depicted table 600 are merely examples selected to illustrate features of the methods of the present invention.

In the example database table 600 shown in FIG. 6, the example fields include a Player Name field 502, a Player ID field 504, a Placement Value field 516, a Number of Drawing Entries field 602, and a Probability Weighting field 604. The first three fields 502, 504, 516 are the same as the corresponding fields from database table 500 and are merely reproduced for clarity and to associate the data with players. In an alternative data structure, database table 500 could include the Number of Drawing Entries field 602, and a Probability Weighting field 604 of database table 600. In such an embodiment, database table 500 may additionally include a Table ID field to represent the game table 402 each player has been assigned for a current game instance.

The Number of Drawing Entries field 602 is adapted to store a value representative of the number of drawing entries for the player associated with the record. In the example depicted, the number of drawing entries can be computed based on the following formula:

$$E = PV + |LNV| + 1$$

Wherein E represents the number of drawing entries for a player, PV represents the Placement Value of the player, and LNV represents the largest negative Placement Value in the group of players assigned to play at the gaming table 402. This equation allows conversion of Placement Value to the number of drawing entries for a player. In accordance with some embodiments, once the number of drawing entries for each player participating in the next game instance of the game is determined, such entries are placed in the drawing and a winner of the drawing is determined using a random or pseudo-random algorithm. For example, if the drawing is for placement of a player into the Big Blind position of a Texas Hold 'Em poker game, the winner is the player whose entry is selected as a result of the drawing, the player to be placed into the Big Blind position for the next hand of the game.

The Probability Weighting field 604 is adapted to store a value representative of the percentage of drawing entries associated with a player compared to the total number of drawing entries in the total pool of entries for the group of players assigned to play the next game instance together. In the example depicted, the percentage of drawing entries can be computed based on the following formula:

$$P = 100(E/\Sigma E)$$

Wherein P represents the percentage of drawing entries associated with a player compared to the total number of drawing entries in the total pool of entries, E represents the number of drawing entries for the player, and $\Sigma E$ represents the sum of all the entries of all the players in the group of players assigned to play the next game instance together. In some embodiments, P can be used to generate the position assignments for each game position. For example, the following formula can be used to select a player for assignment to the Big Blind position 408:

$$BB = \{_{i \in n}{}^{max} P_i(RNG(0,100)_i)\}$$

Wherein BB represents the player assigned to the Big Blind position, i represents an index uniquely identifying each player in the group or set of players assigned to play the next game instance together, n represents the number of players in the set (i.e., "10" in the above examples), $P_i$ represents the percentage of drawing entries associated with player i, and RNG(0,100) i represents a random number (e.g., between 0 and 100) generated for player i.

In another example, the following formula can be used to select a player for assignment to the Button position 404:

$$B = {}_{i \in n}{}^{min}\{P_i(RNG(0,100)_i)\}$$

Wherein B represents the player assigned to the Button position, i represents an index uniquely identifying each player in the group or set of players assigned to play the next game instance together, n represents the number of players in the set (i.e., "10" in the above examples), $P_i$ represents the percentage of drawing entries associated with player i, and RNG(0,100) i represents a random number (e.g., between 0 and 100) generated for player i.

Figure 7:
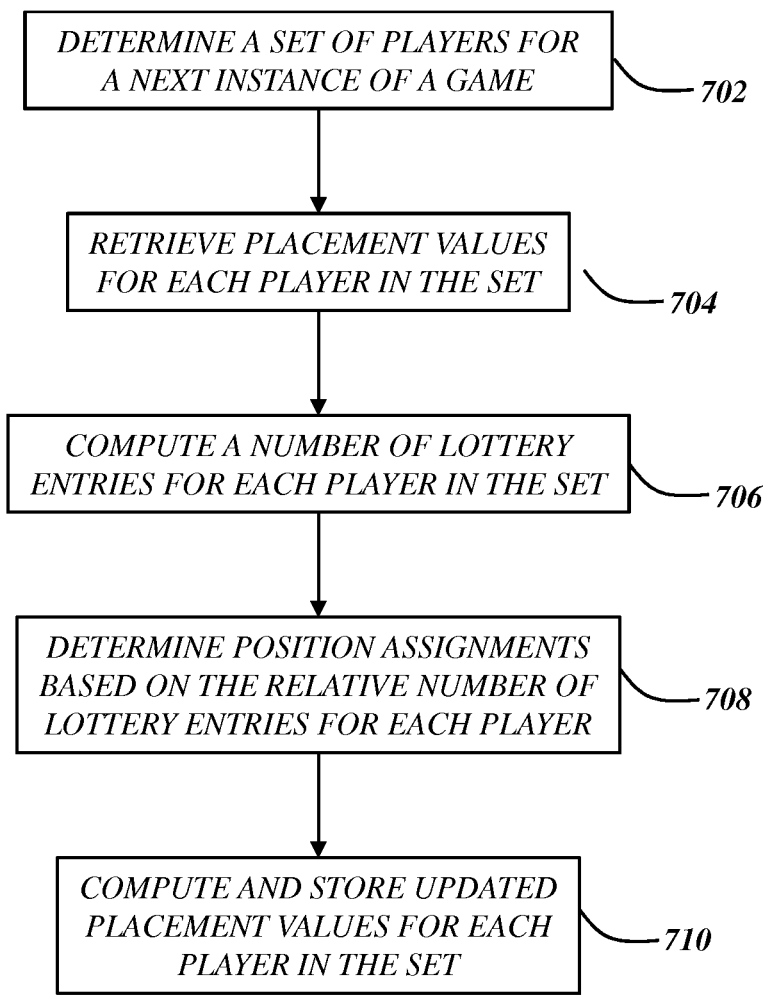
FIG. 7 is a flowchart illustrating a first example method of determining player position according to one or more embodiments described herein.

Turning now to FIG. 7, a flow chart depicting an example method of embodiments of the present invention is provided. Initially, a set of players for a next game instance of a game is identified (702). In some embodiments, identifying players for a group to play a game instance together (e.g., at the same virtual game table) may be performed on a first come first serve basis or randomly. In some embodiments, players may be selected based on certain characteristics. For example, to reduce the chance that a player will experience play in a disadvantaged position during two consecutive play instances (e.g., poker hands), players with widely varying Placement Values can be selected for a given group.

Once a group of players has been selected to play together in a next game instance, Placement Values for each player in the group are retrieved from a database (704). In some embodiments, Placement Values can be calculated based on players' position history. For example, a database of the position each player experienced in all prior game instances can be maintained and a Placement Value can be computed based on the formula described above with respect to FIG. 5. For example, in some embodiments, if a player experiences play in an advantageous position, the player's Placement Value is increased. If a player experiences play in a disadvantageous position, the player's Placement Value is decreased. In other embodiments, higher Placement Values can be used to reflect more frequent experiences playing in a disadvantageous position. In alternative embodiments, a running calculation for each player's Placement Value can be maintained.

Based on each player's individual Placement Value, a number of lottery entries can be computed for each player in the group (706). In some embodiments, the number of lottery entries is determined by adding a constant to each player's Placement Value where the constant is selected such that the smallest number of lottery entries for any player in the group is equal to one. Thus, players who have experienced more play in disadvantageous positions than others will have fewer lottery entries and players who have experienced more play in advantageous positions with have a greater number of lottery entries.

In some embodiments, the player position assignments are determined based on a drawing for each position using all the lottery entries for all the players in the group (708). In some embodiments, the most disadvantaged position is assigned first based on a lottery drawing using all the player's lottery entries. The next most disadvantaged position is assigned next using only the remaining player's lottery entries. The assignments proceed in this manner through the least disadvantaged position to the least advantaged position and on to the most advantaged position where the last player to have a lottery entry in the pool is assigned to the most advantaged position. In some embodiments, a probability weighting is determined based on the Placement Value and the player positions are assigned using a random number generator function and the probability weighting. In some embodiments, instead of using a lottery, other methods of determining position placement based on the Placement Values can be employed. For example, Placement Values can be used to influence the selection of pseudo-random numbers from a pseudo-random number generator (PRNG) algorithm configured to provide outcomes based on a weighting input such as the Placement Values.

Finally, updated Placement Values are computed and stored for subsequent game instances based on the position assignments for the current game instance (710). In embodiments where Placement Values are computed based on a player's position history, the database that stores the record of positions the players experience is updated based on the position assignment for the current game instance.

Figure 8:
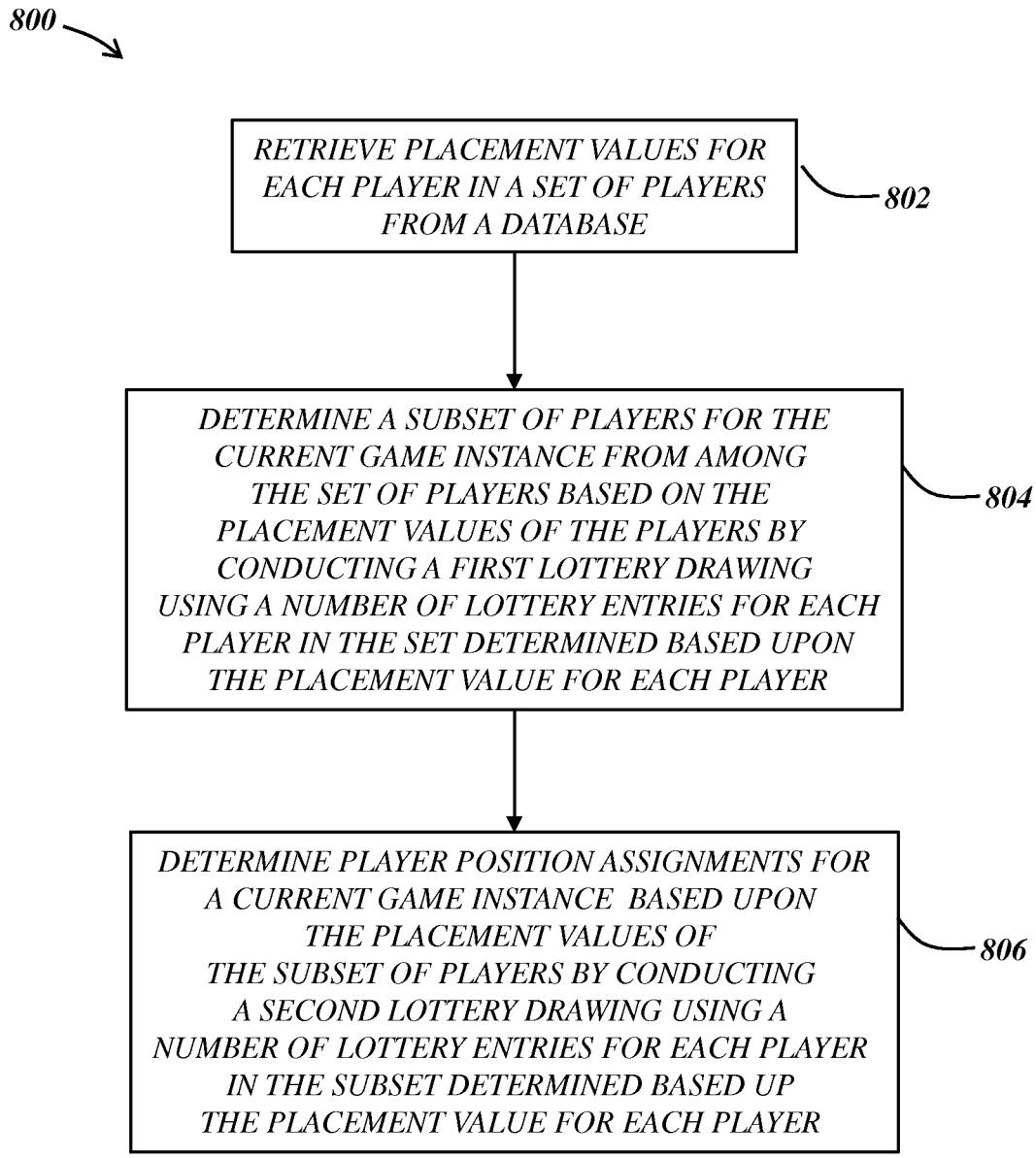
FIG. 8 is a flowchart illustrating a second example method of determining player position according to one or more embodiments described herein.

Turning now to FIG. 8, a flow chart depicting a second example method of embodiments of the present invention is provided. Initially, a placement value for each player in a set of players is retrieved from a database (802). The placement value represents a relative measure of advantages and disadvantages related to positions experienced by each player in prior game instances. Next, a subset of players for the current game instance is determined from among the set of players based on the placement values of the players by conducting a first lottery drawing using a number of lottery entries for each player in the set determined based upon the placement value for each player (804). Then, player position assignments for a current game instance are determined based upon the placement values of the subset of players by conducting a second lottery drawing using a number of lottery entries for each player in the subset determined based up the placement value for each player (806).

As can be appreciated from the above description and examples, the described methodologies which introduce a weighting or bias into an otherwise random or pseudo-random process, maintain a level of unpredictability desired by many players. For example, while the determination of the number of entries into a drawing based on past placement of a player leans towards a desired result, use of a random or pseudo-random algorithm for selecting an entry from the pool of entries may in some instances result in a player who was placed in a particularly disadvantageous position (e.g., the Big Blind position in a Texas Hold 'Em poker game) being again placed in this position twice in a row, or in a relatively disproportionate number of game plays as compared to placement in this position of other players.

In some embodiments, the level of randomness can be reduced or even eliminated. For example, the weighting can be set such that the likelihood of a player experiencing a disproportionate amount of advantageous or disadvantageous seating assignments is extremely low or even zero. In other words, embodiments of the present invention allow seating positions to be assigned based on a deterministic method that does not include any randomness. For example, in some embodiments, a player can be assigned to the Big Blind position once every ten hands played.

It should be noted that while various particular examples have been provided herein, the inventive concepts should not be limited to such examples. Other variations of the above-described embodiments would be readily appreciated by one of ordinary skill in the art upon reading the present disclosure. For example, while determining a player to place in a particular position of a game has been described in the context of a lottery or drawing type scheme, a deterministic scheme which simply utilized a Placement Value to place a player into a position may also be used (although such a deterministic scheme may result in undesirable patterns). In another example, while many embodiments involving a poker card game have been described, the embodiments are also applicable to other types of games. For example, a 4-player electronic board-type game might be most favorable for the first player, some advantage for the second, a small disadvantage for the third, and worst for the last player (e.g., a game with a race component). Using a biased seat lottery or other biased yet random methodology described herein for subsequent games would solve the same problem of unfairness. In another example, the methodologies described herein could be used in a chess or other type of tournament (e.g., to determine who plays who in the next round and/or to determine which pieces are assigned to each player (e.g., black or white)).

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™ Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A method of determining a player position in a game instance, the method comprising:
   generating and storing in a database, by a processor of a computing device operable to facilitate placement of players in an electronic game, a placement value for each player in a set of players participating in a game, wherein the placement value represents a relative measure of advantages and disadvantages related to at least one position experienced by each player in prior game instances;
   retrieving, from the database and by the processor, the placement value for each player in the set of players;
   determining, by the processor, player position assignments for a current game instance based upon the placement values,
   wherein determining player position assignments includes determining a number of lottery entries for each player based on the placement value of each player, and further wherein a placement value indicating a relatively more advantageous position for the current game instance corresponds to a relatively larger number of lottery entries being determined for a player assigned to this relatively advantageous position for the current game instance while a placement value indicating a relatively disadvantageous position for the current game instance corresponds to a relatively smaller number of lottery entries being determined for a player assigned to this relatively disadvantageous position for the current game instance;
   entering each lottery entry of the number of lottery entries for each player into a lottery drawing for selecting which player is to be placed into the relatively disadvantageous player position for a subsequent game instance; and
   determining player position assignments for the subsequent game instance by implementing the lottery drawing.

2. The method of claim 1 further comprising storing player positions experienced during the current game instance.

3. The method of claim 1 further comprising determining updated placement values for each player based on player positions experienced during the current game instance.

4. The method of claim 1 further comprising determining the set of players for the current game instance based on the placement values of the players.

5. The method of claim 1 wherein retrieving the placement value includes computing the placement value based upon a number of times a player has previously experienced play in the relatively advantageous position and in the relatively disadvantageous position.

6. The method of claim 1 wherein determining the number of lottery entries for each player includes converting each placement value to a number of lottery entries by adding a same constant to each of the placement values.

7. A system for determining a player position in a game instance, the system comprising:
a processor; and
a memory storing instructions, the instructions adapted to execute on the processor to:
generate and store in a database a placement value for each player in a set of players participating in a game, wherein the placement value represents a relative measure of advantages and disadvantages related to at least one position experienced by each player in prior game instances;
retrieve, for a current game instance, the placement value from the database for each player in a set of players;
determine, via a lottery drawing, which player to assign to a relatively disadvantageous player position for the current game instance based upon the placement values,
wherein determining player position assignments includes determining a number of lottery entries for the lottery drawing for each player based on the placement value of each player, and wherein a placement value indicating placement in relatively more advantageous positions for prior game instances corresponds to a relatively larger number of lottery entries for the lottery drawing to determine which player to assign to the relatively disadvantageous player position for the current game instance while a placement value indicating a placement in relatively disadvantageous positions in prior game instances corresponds to a relatively smaller number of lottery entries for the lottery drawing to determine which player to assign to the relatively disadvantageous player position for the current game instance;
enter each lottery entry of the number of lottery entries for each player into the lottery drawing for selecting which player is to be placed into the relatively disadvantageous player position for the current game instance; and
determine player position assignments for the current game instance by implementing the lottery drawing.

8. The system of claim 7 wherein the instructions are further adapted to store player positions experienced during the current game instance in the database.

9. The system of claim 7 wherein the instructions are further adapted to determine updated placement values for each player based on player positions experienced during the current game instance.

10. The system of claim 7 wherein the instructions are further adapted to determine the set of players for the current game instance based on the placement values of the players.

11. The system of claim 7 wherein the instructions to retrieve the placement value includes instructions to compute the placement value based upon a number of times a player has previously experienced play in a relatively advantageous position and in a relatively disadvantageous position.

12. The system of claim 7 wherein the instructions to determine the number of lottery entries for each player includes instructions to convert each placement value to a number of lottery entries by adding a same constant to each of the placement values.

13. A method for determining, for a current game instance of a game, placement of a player into a particular position of the game, the game including a multi-player game having a plurality of available positions, the method comprising:
determining, by a processor of a computing device operable to facilitate the game, a first placement value associated with a first player and having been previously generated by the processor for the first player based on at least one position into which the first player was placed in at least one past game instance of the game, the first placement value being indicative of relative advantages or disadvantages of the at least one position into which the first player was placed in the at least one past game instance of the game;
determining, by the processor and based on the first placement value, a first number of entries into a drawing for the particular position, wherein the first player is associated with each entry of the first number of entries;
determining, by the processor, a second placement value associated with a second player and having been previously generated by the processor for the first player based on at least one position into which the second player was placed in at least one past game instance of the game, the second placement value being indicative of relative advantages or disadvantages of the at least one position into which the second player was placed in the at least one past game instance of the game;
determining, by the processor and based on the second placement value, a second number of entries into the drawing for the particular position, wherein the second player is associated with each entry of the second number of entries;
entering, by the processor, each entry of the first number of entries and each entry of the second number of entries in the drawing; and
determining, by the processor, a player to place into the particular position by randomly drawing an entry from among all the entries.

14. The method of claim 13, wherein the more disadvantageous at least one position into which a player was placed in a previous game instance, the more negative is the placement value associated with the player.

15. The method of claim 14, wherein the particular position is a disadvantageous position and wherein the number of entries into the drawing is reduced as the placement value becomes more negative.

16. The method of claim 13, wherein determining a number of entries into the drawing includes adding a same numerical constant to each of the first placement value and the second placement value.

17. A system for determining a player position in a game instance, the system comprising:
a processor; and
a memory storing instructions, the instructions adapted to execute on the processor to:
determine a first placement value associated with a first player and having been previously generated by the processor for the first player based on at least one position into which the first player was placed in at least one past game instance of a game, the first placement value being indicative of relative advantages or disadvantages of the at least one position into which the first player was placed in the at least one past game instance of the game;
determine a first number of entries into a drawing for the particular position, wherein the first player is associated with each entry of the first number of entries;
determine a second placement value associated with a second player and having been previously generated by the processor for the second player based on at least one position into which the first player was placed in at least one past game instance of the game, the second placement value being indicative of relative advantages or disadvantages of the at least one position into which the second player was placed in the at least one past game instance of the game;

determine based on the second placement value, a second number of entries into the drawing for the particular position, wherein the second player is associated with each entry of the second number of entries;

enter each entry of the first number of entries and each entry of the second number of entries in the drawing; and determine a player to place into the particular position by randomly drawing an entry from among all the entries.

18. A non-transitory computer readable medium storing instructions for directing a processor, the instructions when executed by the processor causing the processor to:

determine a first placement value associated with a first player and having been previously generated for the first player based on at least one position into which the first player was placed in at least one past game instance of a game, the first placement value being indicative of relative advantages or disadvantages of the at least one position into which the first player was placed in the at least one past game instance of the game;

determine a first number of entries into a drawing for the particular position, wherein the first player is associated with each entry of the first number of entries;

determine a second placement value associated with a second player and having been previously generated for the first player based on at least one position into which the first player was placed in at least one past game instance of the game, the second placement value being indicative of relative advantages or disadvantages of the at least one position into which the second player was placed in the at least one past game instance of the game;

determine based on the second placement value, a second number of entries into the drawing for the particular position, wherein the second player is associated with each entry of the second number of entries;

enter each entry of the first number of entries and each entry of the second number of entries in the drawing; and determine a player to place into the particular position by randomly drawing an entry from among all the entries.

* * * * *